(12) United States Patent
Ricart et al.

(10) Patent No.: US 10,950,977 B2
(45) Date of Patent: Mar. 16, 2021

(54) TRACK ASSEMBLY FOR A VEHICLE COMPONENT

(71) Applicant: Lear Corporation, Southfield, MI (US)

(72) Inventors: Raul Ricart, Valls (ES); Antoni Ferré Fàbregas, Valls (ES); Esteban Herrera, Valls (ES); Paloma Peinado Rodriguez, El Pla de Santa Maria (ES); Josep Jacas Miret, Valls (ES); Enric Aparicio Rollan, Valls (ES); Jeffrey A. Jones, Ann Arbor, MI (US); Dale Lammers, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/223,966

(22) Filed: Dec. 18, 2018

(65) Prior Publication Data
US 2020/0194936 A1    Jun. 18, 2020

(51) Int. Cl.
*H01R 13/631* (2006.01)
*B60N 2/07* (2006.01)
(Continued)

(52) U.S. Cl.
CPC ......... *H01R 13/6315* (2013.01); *B60N 2/015* (2013.01); *B60N 2/0715* (2013.01);
(Continued)

(58) Field of Classification Search
CPC ............ H01R 13/2421; H01R 13/6315; H01R 13/73; B60N 2/015; B60N 2/0715; B60N 2002/0264
See application file for complete search history.

(56) References Cited

U.S. PATENT DOCUMENTS 2,126,143 A    8/1938   McGregor
2,263,554 A    11/1941  Brach
(Continued)

FOREIGN PATENT DOCUMENTS

CN    203190203 U    9/2013
CN    203799201 U    8/2014
(Continued)

OTHER PUBLICATIONS

Co-pending U.S. Appl. No. 16/672,989, filed Nov. 4, 2019.
(Continued)

*Primary Examiner* — Edwin A. Leon
(74) *Attorney, Agent, or Firm* — Fishman Stewart PLLC

(57) ABSTRACT

A track assembly includes a track, a support member, a support member conductor, a first conductor and a plurality of second conductors. The support member conductor may be configured to move substantially laterally and electrically contact the second conductors. The second conductor may be configured to move laterally and electrically contact the first conductor. The support member conductor may be configured to move the second conductor into electrical contact with the first conductor. The first conductor may extend substantially in the longitudinal direction and/or the first conductor may be disposed at least partially in the track. The plurality of second conductors may be disposed such that the support member conductor may be in contact with at least two second conductors of the plurality of second conductors in all positions of the support member relative to the track.

20 Claims, 8 Drawing Sheets

(51) Int. Cl.
*B60N 2/015* (2006.01)
*H01R 13/73* (2006.01)
*H01R 13/424* (2006.01)
*B60N 2/02* (2006.01)

(52) U.S. Cl.
CPC .......... *H01R 13/424* (2013.01); *H01R 13/73* (2013.01); *B60N 2002/0264* (2013.01); *H01R 2201/26* (2013.01)

(56) References Cited

U.S. PATENT DOCUMENTS

| | | | |
|---|---|---|---|
| 2,480,622 A | 8/1949 | Warnock | |
| 2,678,082 A | 5/1954 | Nathan | |
| 3,181,102 A | 4/1965 | Fehr | |
| 3,213,403 A | 10/1965 | Hermann | |
| 3,268,848 A | 8/1966 | Adams | |
| 3,603,918 A * | 9/1971 | Woertz | H01R 25/142 439/115 |
| 3,933,403 A * | 1/1976 | Rubesamen | H01R 25/142 439/121 |
| 3,940,182 A | 2/1976 | Tamura | |
| 4,020,769 A | 5/1977 | Keir | |
| 4,198,025 A | 4/1980 | Lowe et al. | |
| 4,243,248 A | 1/1981 | Scholz et al. | |
| 4,282,631 A | 8/1981 | Uehara et al. | |
| 4,511,187 A | 4/1985 | Rees | |
| 4,575,295 A | 3/1986 | Rebentisch | |
| 4,618,808 A | 10/1986 | Ish-Shalom et al. | |
| 4,707,030 A | 11/1987 | Harding | |
| 4,711,589 A | 12/1987 | Goodbred | |
| 4,763,360 A * | 8/1988 | Daniels | B64C 1/20 381/77 |
| 4,776,809 A | 10/1988 | Hall | |
| 4,830,531 A | 5/1989 | Condit et al. | |
| 4,853,555 A | 8/1989 | Wheat | |
| 4,961,559 A | 10/1990 | Raymor | |
| 4,969,621 A | 11/1990 | Munchow et al. | |
| 4,987,316 A | 1/1991 | White et al. | |
| 5,137,331 A | 8/1992 | Colozza | |
| 5,167,393 A | 12/1992 | Hayakawa et al. | |
| 5,192,045 A | 3/1993 | Yamada et al. | |
| 5,222,814 A | 6/1993 | Boelryk | |
| 5,322,982 A | 6/1994 | Leger et al. | |
| 5,332,290 A | 7/1994 | Borlinghaus et al. | |
| 5,348,373 A | 9/1994 | Stiennon | |
| 5,362,241 A * | 11/1994 | Matsuoka | H01R 13/2471 439/591 |
| 5,446,442 A | 8/1995 | Swart et al. | |
| 5,466,892 A | 11/1995 | Howard et al. | |
| 5,489,173 A | 2/1996 | Hofle | |
| 5,582,381 A | 12/1996 | Graf et al. | |
| 5,599,086 A | 2/1997 | Dutta | |
| 5,618,192 A | 4/1997 | Drury | |
| 5,655,816 A | 8/1997 | Magnuson et al. | |
| 5,676,341 A | 10/1997 | Tarusawa et al. | |
| 5,696,409 A | 12/1997 | Handrnan et al. | |
| 5,701,037 A | 12/1997 | Weber et al. | |
| 5,796,177 A | 8/1998 | Werbelow et al. | |
| 5,800,015 A | 9/1998 | Tsuchiya et al. | |
| 5,899,532 A | 5/1999 | Paisley et al. | |
| 5,918,847 A | 7/1999 | Couasnon | |
| 5,921,606 A | 7/1999 | Moradell et al. | |
| 5,964,442 A | 10/1999 | Wingblad et al. | |
| 5,964,815 A | 10/1999 | Wallace et al. | |
| 6,036,157 A | 3/2000 | Baroin et al. | |
| 6,142,718 A | 11/2000 | Kroll | |
| 6,150,774 A | 11/2000 | Mueller et al. | |
| 6,166,451 A | 12/2000 | Pigott | |
| 6,216,995 B1 | 4/2001 | Koester | |
| 6,227,595 B1 | 5/2001 | Hamelin et al. | |
| 6,290,516 B1 * | 9/2001 | Gerber | H01R 25/14 439/110 |
| 6,296,498 B1 | 10/2001 | Ross | |
| 6,299,230 B1 | 10/2001 | Oettl | |
| 6,318,802 B1 | 11/2001 | Sjostrom et al. | |
| 6,325,645 B1 * | 12/2001 | Schuite | A47G 1/1686 439/110 |
| 6,357,814 B1 | 3/2002 | Boisset et al. | |
| 6,400,259 B1 | 6/2002 | Bourcart et al. | |
| 6,405,988 B1 | 6/2002 | Taylor et al. | |
| 6,422,596 B1 | 7/2002 | Fendt et al. | |
| 6,439,531 B1 | 8/2002 | Severini et al. | |
| 6,480,144 B1 | 11/2002 | Miller et al. | |
| 6,693,368 B2 | 2/2004 | Schumann et al. | |
| 6,710,470 B2 | 3/2004 | Bauer et al. | |
| 6,719,350 B2 | 4/2004 | Duchateau et al. | |
| 6,736,458 B2 | 5/2004 | Chabanne et al. | |
| 6,772,056 B2 | 8/2004 | Mattes et al. | |
| 6,805,375 B2 | 10/2004 | Enders et al. | |
| 6,851,708 B2 | 2/2005 | Kazmierczak | |
| 6,882,162 B2 | 4/2005 | Schirmer et al. | |
| 6,960,993 B2 | 11/2005 | Mattes et al. | |
| 7,042,342 B2 | 5/2006 | Luo et al. | |
| 7,083,437 B2 | 8/2006 | Mackness | |
| 7,086,874 B2 | 8/2006 | Mitchell et al. | |
| 7,113,541 B1 | 9/2006 | Lys et al. | |
| 7,159,899 B2 | 1/2007 | Nitschke et al. | |
| 7,170,192 B2 | 1/2007 | Kazmierczak | |
| 7,188,805 B2 | 3/2007 | Henley et al. | |
| 7,207,541 B2 | 4/2007 | Frohnhaus et al. | |
| 7,271,501 B2 | 9/2007 | Dukart et al. | |
| 7,288,009 B2 * | 10/2007 | Lawrence | B60N 2/002 439/824 |
| 7,293,831 B2 | 11/2007 | Greene | |
| 7,300,091 B2 | 11/2007 | Nihonmatsu et al. | |
| 7,322,605 B2 | 1/2008 | Ventura et al. | |
| 7,348,687 B2 | 3/2008 | Aichriedler et al. | |
| 7,363,194 B2 | 4/2008 | Schlick et al. | |
| 7,370,831 B2 * | 5/2008 | Laib | B64C 1/18 174/70 B |
| 7,388,466 B2 | 6/2008 | Ghabra et al. | |
| 7,389,960 B2 | 6/2008 | Mitchell et al. | |
| 7,416,042 B2 | 8/2008 | Czaykowska et al. | |
| 7,434,883 B2 | 10/2008 | Deptolla | |
| 7,454,170 B2 | 11/2008 | Goossens et al. | |
| 7,455,535 B2 | 11/2008 | Insalaco et al. | |
| 7,503,522 B2 * | 3/2009 | Henley | B64D 11/06 244/118.5 |
| 7,505,754 B2 | 3/2009 | Kazmierczak et al. | |
| 7,523,913 B2 | 4/2009 | Mizuno et al. | |
| 7,556,233 B2 | 7/2009 | Gryp et al. | |
| 7,560,827 B2 | 7/2009 | Jacas-Miret et al. | |
| 7,633,301 B2 | 12/2009 | Steenwyk et al. | |
| 7,661,637 B2 | 2/2010 | Mejuhas et al. | |
| 7,665,939 B1 | 2/2010 | Cardona | |
| 7,739,820 B2 | 6/2010 | Frank | |
| 7,744,386 B1 * | 6/2010 | Speidel | H01R 25/145 439/118 |
| 7,980,525 B2 | 7/2011 | Kostin | |
| 7,980,798 B1 | 7/2011 | Kuehn et al. | |
| 8,010,255 B2 | 8/2011 | Darraba | |
| 8,146,991 B2 | 4/2012 | Stanz et al. | |
| 8,278,840 B2 | 10/2012 | Logiudice et al. | |
| 8,282,326 B2 | 10/2012 | Krostue et al. | |
| 8,376,675 B2 | 2/2013 | Schulze et al. | |
| 8,463,501 B2 | 6/2013 | Jousse | |
| 8,536,928 B1 | 9/2013 | Gagne et al. | |
| 8,648,613 B2 | 2/2014 | Ewerhart et al. | |
| 8,702,170 B2 | 4/2014 | Abraham et al. | |
| 8,757,720 B2 | 6/2014 | Hurst, III et al. | |
| 8,800,949 B2 | 8/2014 | Schebaum et al. | |
| 8,857,778 B2 | 10/2014 | Nonomiya | |
| 8,936,526 B2 | 1/2015 | Boutouil et al. | |
| 8,967,719 B2 | 3/2015 | Ngiau et al. | |
| RE45,456 E | 4/2015 | Sinclair et al. | |
| 9,010,712 B2 | 4/2015 | Gray et al. | |
| 9,018,869 B2 | 4/2015 | Yuasa et al. | |
| 9,045,061 B2 | 6/2015 | Kostin et al. | |
| 9,162,590 B2 | 10/2015 | Nagura et al. | |
| 9,174,604 B2 | 11/2015 | Wellhoefer et al. | |
| 9,242,580 B2 | 1/2016 | Schebaum et al. | |
| 9,318,922 B2 | 4/2016 | Hall et al. | |
| 9,340,125 B2 | 5/2016 | Stutika et al. | |

(56) References Cited

U.S. PATENT DOCUMENTS

| | | |
|---|---|---|
| 9,346,428 B2 | 5/2016 | Bortolin |
| 9,422,058 B2 | 8/2016 | Fischer et al. |
| 9,561,770 B2 | 2/2017 | Sievers et al. |
| 9,608,392 B1 * | 3/2017 | Destro ................ H01R 25/145 |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,547,135 B2 * | 1/2020 | Sugiura ................ H01R 11/01 |
| 10,549,659 B2 | 2/2020 | Sullivan et al. |
| 10,654,378 B2 | 5/2020 | Pons |
| 2005/0046367 A1 | 3/2005 | Wevers et al. |
| 2005/0089367 A1 | 4/2005 | Sempliner |
| 2005/0150705 A1 | 7/2005 | Vincent et al. |
| 2005/0211835 A1 | 9/2005 | Henley et al. |
| 2005/0215098 A1 | 9/2005 | Muramatsu et al. |
| 2005/0230543 A1 | 10/2005 | Laib et al. |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1 | 4/2008 | Patterson et al. |
| 2009/0014584 A1 | 1/2009 | Rudduck et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1 | 8/2020 | Fernández Bañares et al. |
| 2020/0269754 A1 | 8/2020 | Ricart et al. |
| 2020/0282880 A1 | 9/2020 | Jones et al. |

FOREIGN PATENT DOCUMENTS

| | | |
|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

OTHER PUBLICATIONS

Co-pending U.S. Appl. No. 16/296,379, filed Mar. 8, 2019.
Co-pending U.S. Appl. No. 16/597,187, filed Oct. 9, 2019.
Co-pending U.S. Appl. No. 16/711,661, filed Dec. 12, 2019.

* cited by examiner

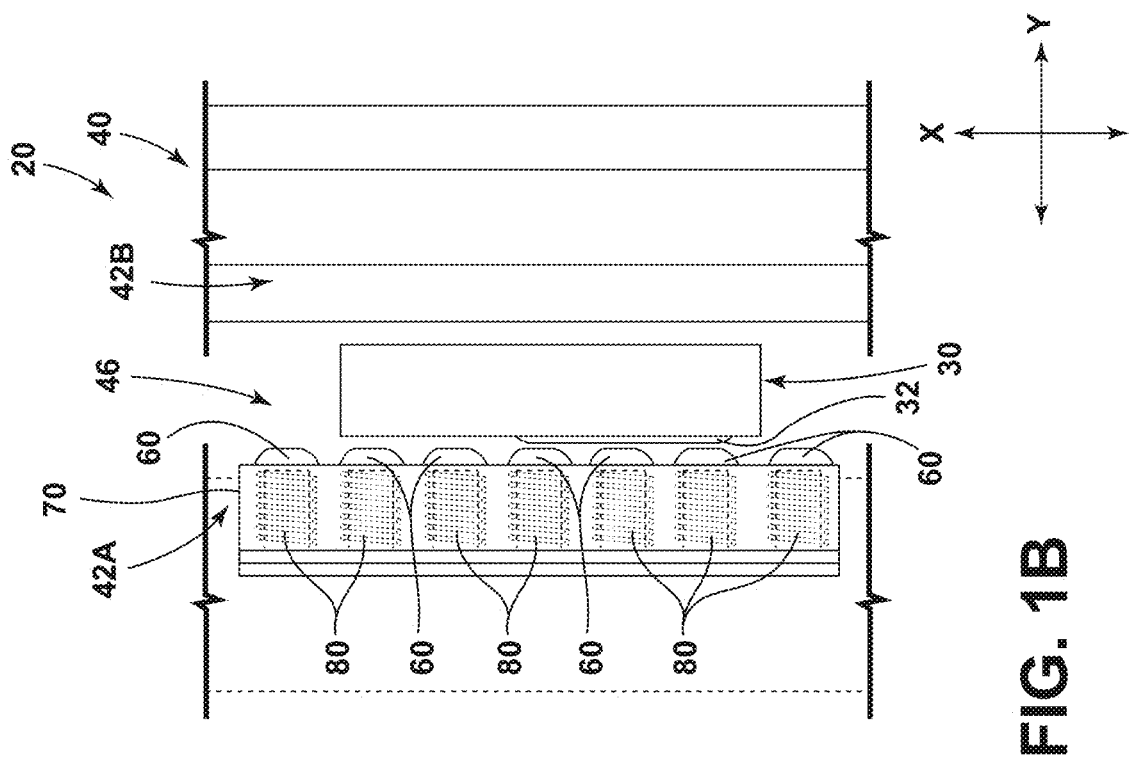
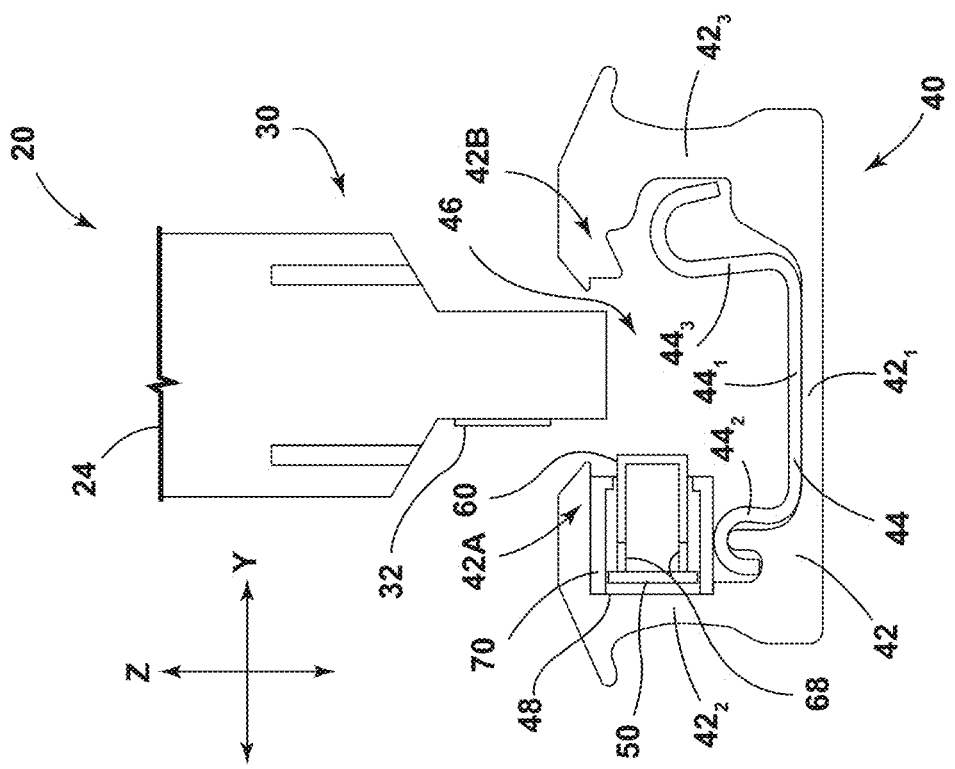
FIG. 1A
FIG. 1B

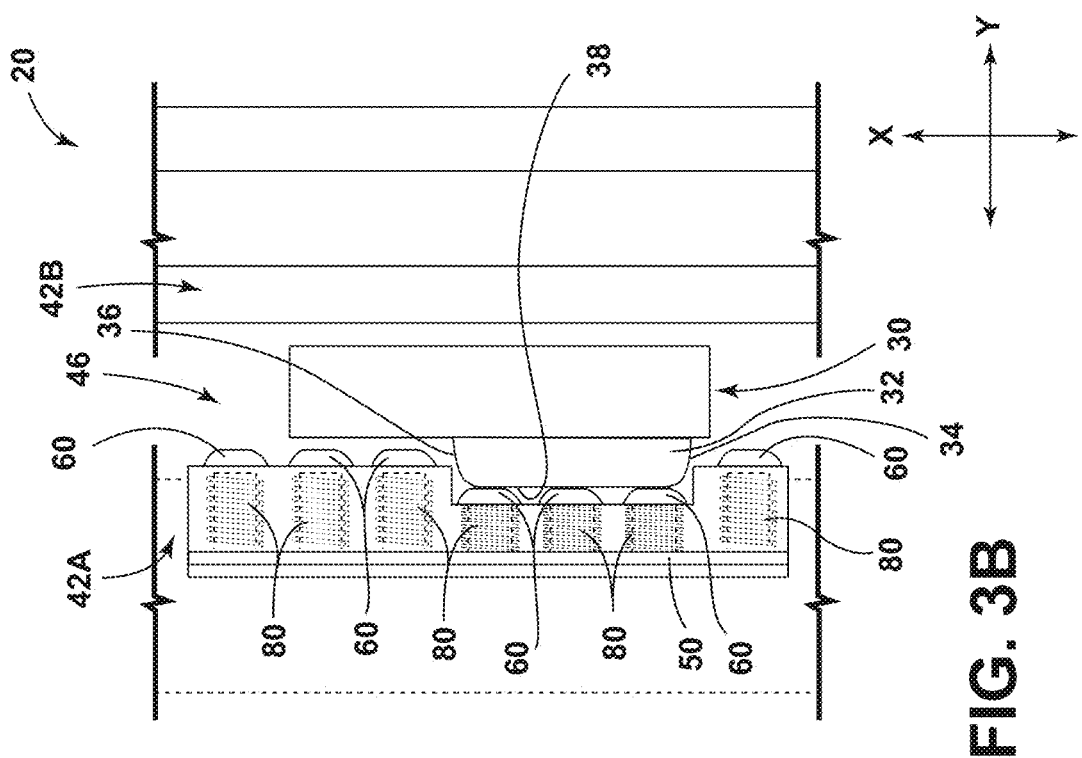
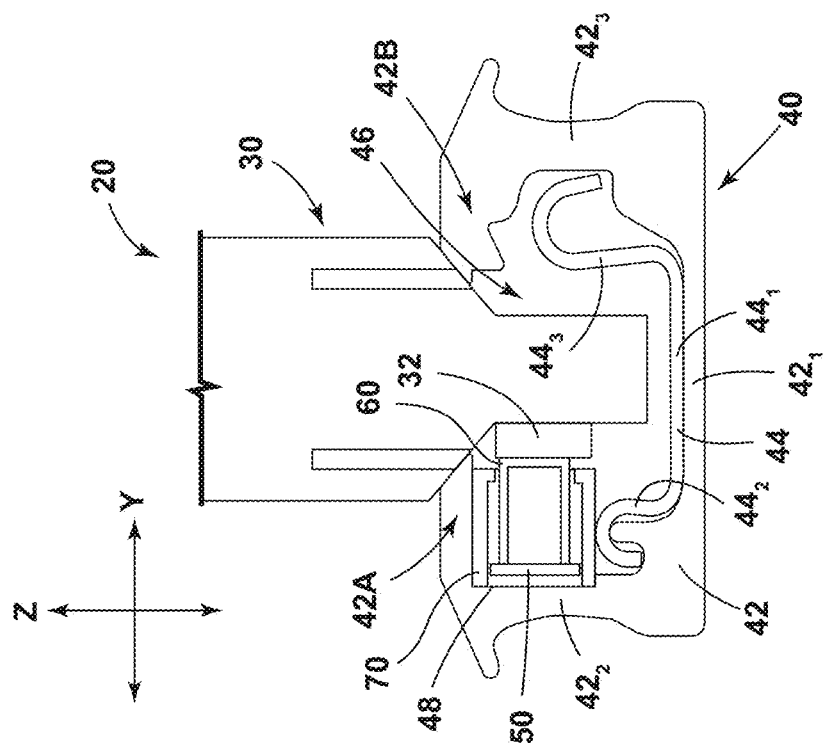
FIG. 3A
FIG. 3B

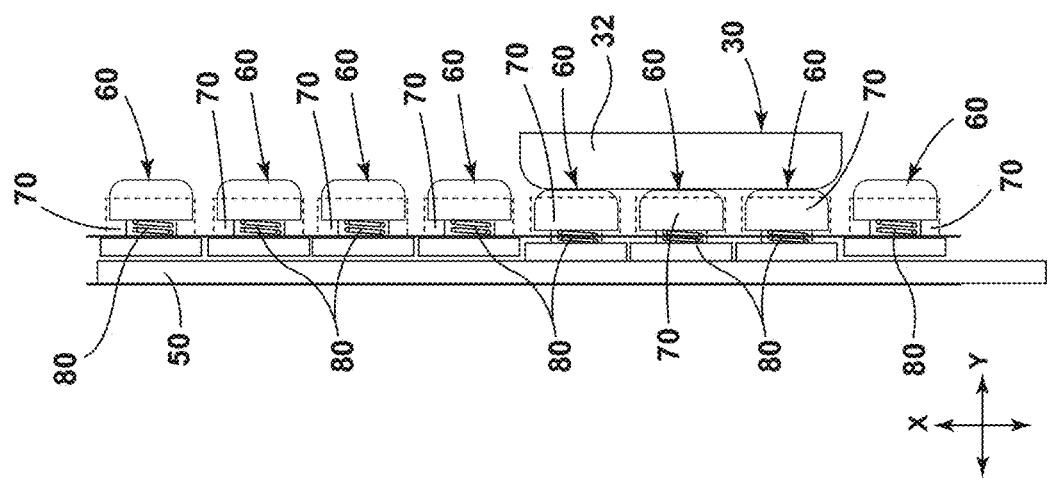
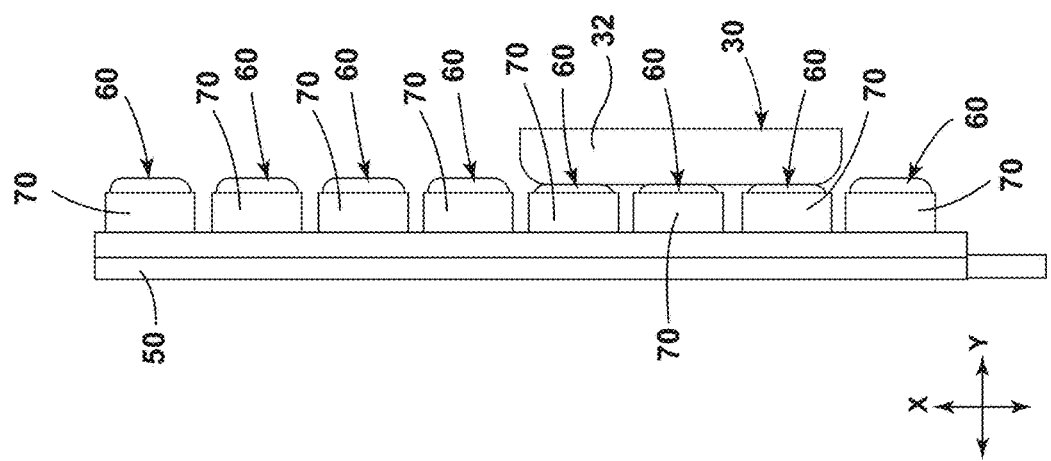

TRACK ASSEMBLY FOR A VEHICLE COMPONENT

TECHNICAL FIELD

The present disclosure generally relates to track assemblies including support members and tracks that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex and/or may not provide sufficient functionality. Some track assemblies may not be configured to selectively connect a support member with a conductor disposed in the track.

There is a desire for solutions/options that minimize or eliminate one or more challenges or shortcomings of track assemblies. The foregoing discussion is intended only to illustrate examples of the present field and should not be taken as a disavowal of scope.

SUMMARY

In embodiments, a track assembly may include a track, a support member, a support member conductor, a first conductor and a plurality of second conductors. The support member conductor may be configured to move substantially laterally and electrically contact the second conductors. The second conductor may be configured to move laterally and electrically contact the first conductor. The support member conductor may be configured to move the second conductor into electrical contact with the first conductor. The first conductor may extend substantially in the longitudinal direction and/or the first conductor may be disposed at least partially in the track. The plurality of second conductors may be disposed such that the support member conductor may be in contact with at least two second conductors of the plurality of second conductors in all positions of the support member relative to the track. The support member conductor may include a first position and/or a second position. When the support member conductor may be in the first position, the support member conductor may be in contact with the second conductor. When the support member conductor may be in the second position, the support member conductor may not be in contact with the second conductor.

With embodiments, the support member may be configured to move vertically when the support member conductor is in the first position, and/or vertical movement of the support member may be limited when the support member conductor is in the second position. The first conductor and the plurality of second conductors may be disposed at least partially within an insulator; and/or the insulator may include an aperture. The support member conductor may be configured to be at least partially disposed in the aperture. The insulator may include a biasing member. The second conductor may include a first end, a second end, and/or a side. The first end and/or the second end may be configured to contact the first conductor, and/or the support member conductor may be configured to contact the side of the second conductor. The second conductor may be substantially U-shaped. The track may include an inner track and/or an outer track. The inner track may be disposed within the outer track. The outer track may include a recess, and/or the first conductor and/or the plurality of second conductors may be disposed at least partially in the recess. The recess may be disposed at least partially between a top of the inner track and a top of the outer track.

In embodiments, a track assembly may include a track and/or a support member that may include a support member conductor. The track assembly may include a first conductor and/or a plurality of second conductors. The support member conductor may include a first position and/or a second position. The support member conductor may be configured so the support member does not contact the plurality of second conductors when in the first position. The support member conductor may be configured to contact at least one of the plurality of second conductors when in the second position. The plurality of second conductors may be fixed to the first conductor.

With embodiments, the track assembly may include an insulator that may have a first portion and/or a plurality of second portions. Each second portion of the plurality of second portions may be associated with a respective second conductor of the plurality of second conductors. The plurality of second portions may be configured to translate to expose the plurality of second conductors to electrical connect the first conductor with the support member conductor. The track assembly may include one or more biasing members that may be configured to bias the plurality of second portions toward an extended position in which the plurality of second conductors are covered by the plurality of second portions. The support member conductor may be configured to move longitudinally along the plurality of second conductors and/or automatically electrically connect the second conductors, the first conductor, and/or the support member conductor. The plurality of second conductors may be configured to move in a first direction when contacted by the support member conductor. The plurality of second conductors may be configured to move in a second direction when no longer in contact with the support member conductor. The first direction may be opposite the second direction. Each of the plurality of second portions may include an aperture. Each of the plurality of second conductors may be configured to extend through the respective aperture when the support member conductor is in contact with each of the plurality of second conductors.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 1A is a cross-sectional view generally illustrating an embodiment of a track assembly according to teachings of the present disclosure.

FIG. 1B is a top cross-sectional view generally illustrating an embodiment of a portion of a track assembly according to teachings of the present disclosure.

FIG. 3A is a cross-sectional view generally illustrating an embodiment of a track assembly according to teachings of the present disclosure.

FIG. 3B is a top cross-sectional view generally illustrating portions of an embodiment of a track assembly according to teachings of the present disclosure.

FIGS. 6A and 6B are top cross-sectional views generally illustrating embodiments of a track assembly according to teachings of the present disclosure.

DETAILED DESCRIPTION

Figure 1C:
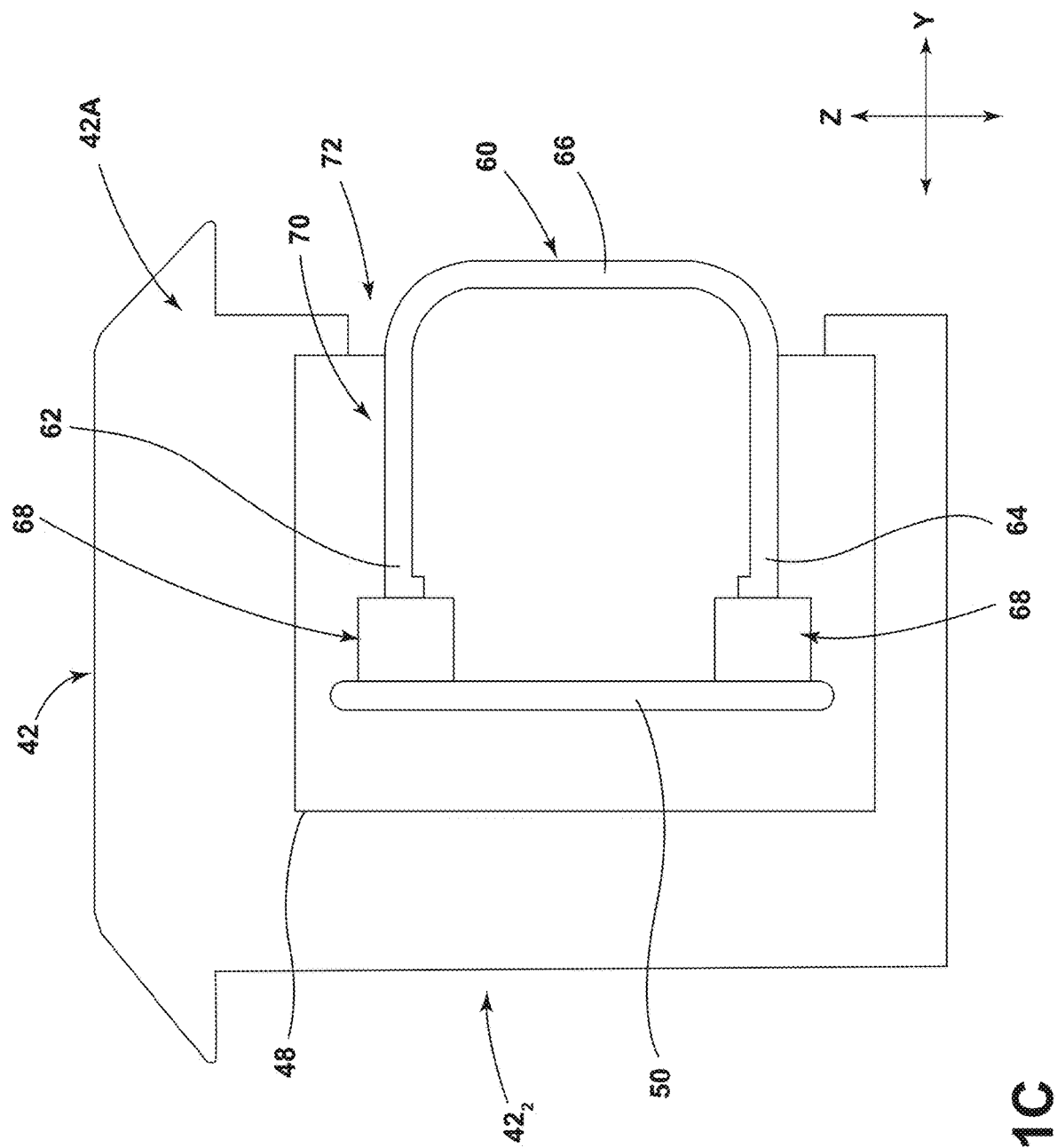
FIG. 1C is a cross-sectional view generally illustrating an embodiment of a portion of a track assembly according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

In embodiments, such as generally illustrated in FIGS. 1A and 1B, a track assembly 20 may include a support member 30 and/or a track 40. The track assembly 20 may be configured for selective electrical connection between the support member 30 and the track 40. For example and without limitation, the track assembly 20 may be configured to provide selective electrical connection between the track 40 (and a power supply 22, such as a vehicle battery, or controller that may be connected to the track 40) that may be connected to a vehicle seat 24, or other removable elements, that may be connected to the support member 30. The track 40 may be connected to a mounting surface 26, such as a vehicle floor. The support member 30 may be configured to support a vehicle seat 24.

Figure 2:
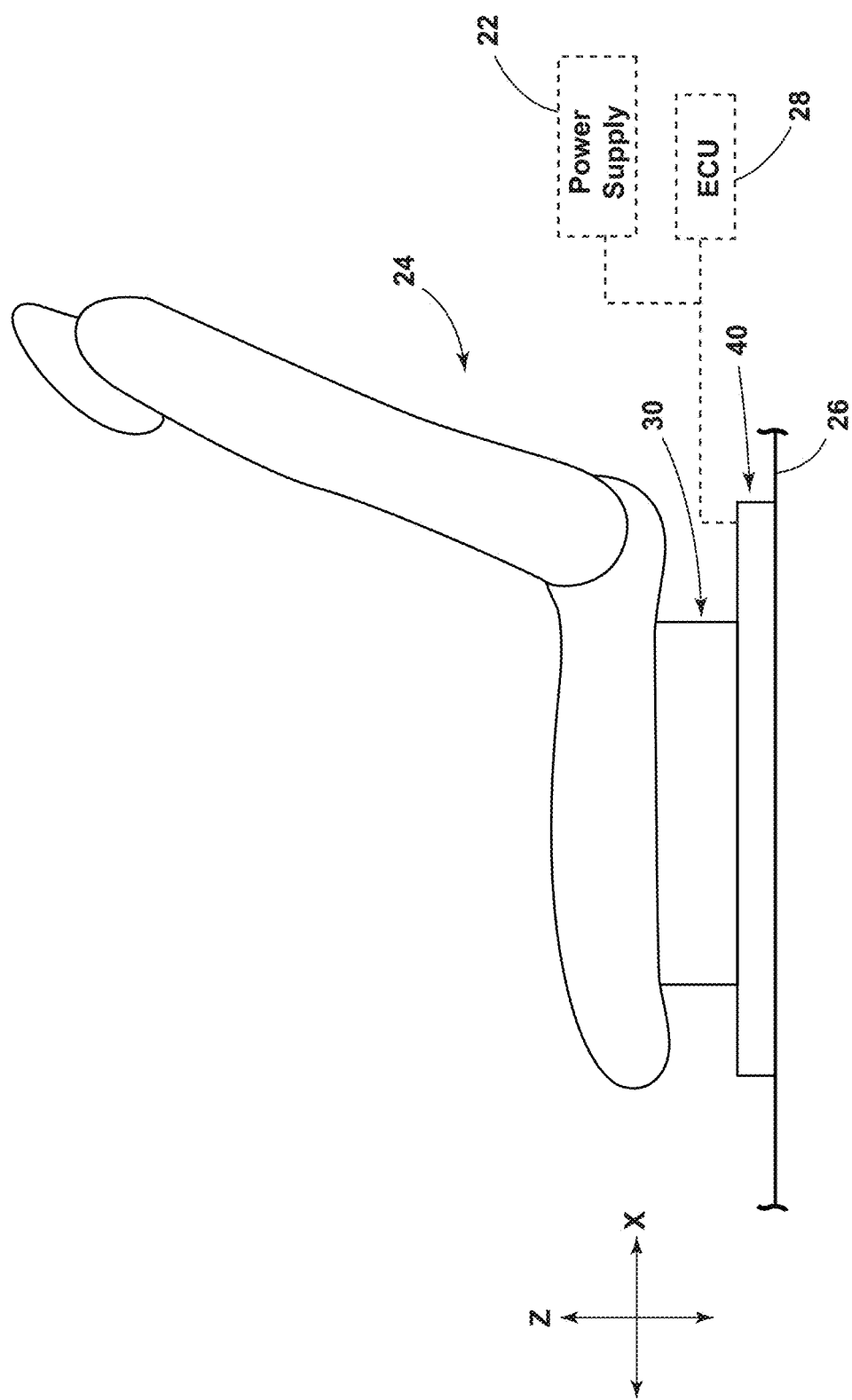
FIG. 2 is a side view generally illustrating an embodiment of a track assembly according to teachings of the present disclosure.

With embodiments, such as generally illustrated in FIG. 2, a support member 30 may be connected to and/or be configured to engage a track assembly 20. The support member 30 and/or the track 40 may extend substantially longitudinally (e.g., in an X-direction). For example and without limitation, the support member 30 may move (e.g., slide, roll, translate, etc.) in a longitudinal direction along the track 40. The support member 30 may selectively engage and/or disengage from the track 40. The support member 30 may be inserted into and/or be removed from the track 40 in a Z-direction (e.g., a vertical direction). The support member 30 may include a cassette configuration. The support member 30 may be connected to and/or include a support member conductor 32 (see, e.g., FIGS. 1A and 1B). The support member conductor 32 may be configured to provide an electrical connection, electrical power, electrical signal data from the track, and/or electrical power combined with electrical signal data from the track 40 to the vehicle seat 24. The support member conductor 32 may be substantially planar (or include a substantially planar portion) and may be substantially aligned with an X-Z plane. The support member conductor 32 may be disposed at a lateral side of the support member 30. The support member conductor 32 may be disposed at least partially within the track 40.

In embodiments, such as generally illustrated in FIG. 1A, a track 40 may include first/outer track 42 and/or a second/inner track 44. The first track 42 and/or the second track 44 may extend substantially in a longitudinal direction (e.g., the X-direction). The first track 42 may include a first/bottom wall $42_1$, a second wall $42_2$, and/or a third wall $42_3$. The bottom wall $42_1$, the second wall $42_2$, and/or the third wall $42_3$ may be connected to form a generally U shaped configuration. The bottom wall $42_1$ may, for example, be substantially planar. The second wall $42_2$ and/or the third wall $42_3$ may extend perpendicularly (e.g., vertically) from opposite sides of the bottom wall $42_1$. The second wall $42_2$ may include a first portion 42A, and/or the third wall $42_3$ may include a second portion 42B. The first portion 42A and/or the second portion 42B may project laterally (e.g., in a Y-direction) toward a center of the track 40. The first portion 42A and/or the second portion 42B may be substantially planar. In embodiments, the first portion 42A and the second portion 42B may be disposed such that a gap 46 may be provided between the first portion 42A and the second portion 42B (e.g., the first portion 42A and the second portion 42B may be offset in the Y-direction). The gap 46 may extend longitudinally along the track 40, and/or the gap 46 may be centered along the track 40.

With embodiments, the second track 44 may be disposed at least partially in the first track 42. For example and without limitation, the second track 44 may be substantially U-shaped. The second track 44 may include a first wall $44_1$, a second wall $44_2$, and/or a third wall $44_3$. The second wall $44_2$ may be shorter than the third wall $44_3$. The second wall $44_2$ and/or the third wall $44_3$ may be partially bent and/or curved. The second wall $44_2$ and the third wall $44_3$ may extend perpendicularly (e.g., vertically) from the bottom wall $44_1$. The bottom wall $44_1$ of the second track 44 may be generally aligned with and/or adjacent to the bottom wall $42_1$ of the first track 42. The second wall $44_2$ of the second track 44 may be generally aligned with and/or adjacent to the second wall $42_2$ of the first track 42. The third wall $44_3$ of the second track 44 may be generally aligned with and/or adjacent to the third wall $42_3$ of the first track 42.

With embodiments, such as generally illustrated in FIGS. 1A and 1C, the first track 42 may include a recess 48. The first track 42 may include more than one recess 48. The recess 48 may be disposed at least partially between a top of the second wall $42_2$ of the first track 42 and a top of the first wall $44_1$ of the second track 44. The recess 48 may extend partially into the second wall $42_2$ (e.g., in the Y-direction). The recess 48 may include one or more of a variety of shapes, sizes, and/or configurations. For example and without limitation, the recess 48 may be substantially rectangular, circular, and/or curved.

In embodiments, such as generally illustrated in FIGS. 1A and 1C, the track 40 may include a first conductor 50. The first conductor 50 may include one or more of a variety of shapes, sizes, and/or configurations. For example and without limitation, the first conductor 50 may be substantially planar and may be substantially aligned with an X-Z plane. The first conductor 50 may extend along part or all of the first track 42 (e.g., in the X-direction). The first conductor 50 may be disposed partially in the recess 48 of the first track 42 and/or the first conductor 50 may be disposed entirely in the recess 48. The first conductor 50 may be configured to be electrically connected to power supply 22 (e.g., a vehicle battery) and/or to an electronic control unit (ECU) 28.

With embodiments, such as generally illustrated in FIGS. 1B and 1C, the track 40 may include a plurality of second conductors 60. The second conductors 60 may be disposed at least partially in the recess 48. The second conductors 60 may include one or more of a variety of shapes, sizes, and/or configurations. For example and without limitation, the second conductors 60 may be substantially U-shaped, rounded, rectangular, and/or cylindrical. The second conductors 60 may be disposed proximate (e.g., adjacent/next to) first conductor 50. The second conductors 60 may extend substantially in the Y-direction, such as inward toward a center of the track 40.

In embodiments, such as generally illustrated in FIGS. 1A, 1B, and 1C, the track 40 may include an insulator 70. The insulator 70 may be configured to electrically insulate the first conductor 50 and/or the second conductors 60 from the track 40. The insulator 70 may include one or more of a variety of electrically insulating materials (e.g., plastic, rubber, etc.). The insulator 70 may have one or more of a variety of shapes, sizes, and/or configurations. For example and without limitation the insulator 70 may be substantially cylindrical and/or rectangular. The insulator 70 may extend the entire length and/or a portion of the length of the first conductor 50. The first conductor 50 and/or the second conductors 60 may be disposed at least partially in the insulator 70. The insulator 70 may include an aperture 72. The aperture 72 may facilitate selective electrical connection between the second conductors 60 and the support member conductor 32. The second conductors 60 may move (e.g., in the Y-direction) within the insulator 70 to selectively contact the first conductor 50 and/or the support member conductor 32.

With embodiments, the support member 30 may receive power from a power supply 22 and/or an ECU 28 (or receive signals/data) via the first conductor 50, the second conductors 60, and/or the support member conductor 32. The support member conductor 32 may selectively connect to the second conductors 60, the second conductors 60 may selectively connect to the first conductor 50, and/or the first conductor 50 may be connected to a power supply 22 and/or an ECU 28 within the vehicle. The support member conductor 32 may be configured to move substantially laterally to electrically contact the second conductors 60, and/or the second conductors 60 may be configured to move substantially laterally to electrically contact the first conductor 50. In an initial/rest position, the second conductors 60 may not be in contact with or electrically connected with the first conductor 50.

In embodiments, such as generally illustrated in FIGS. 1A, 1B, 1C, 3A, 3B, and 3C, the support member conductor 32 may have a first position and/or a second position. The support member conductor 32 may be configured to move between the first position and the second position. When the support member conductor 32 is in the first position, the support member conductor 32 may not substantially project outward from the support member 30 (see, e.g., FIGS. 1A, 1B, and 1C), and/or the support member conductor 32 may be disposed substantially in the support member 30. The support member 30 may be vertically inserted (e.g., in the Z-direction) into the track 40 when the support member conductor 32 is in the first position, and/or the support member 30 may be vertically removed (e.g., in the Z-direction) from the track 40 when the support member conductor 32 is in the first position. The support member conductor 32 may not be in contact (e.g., electrical contact and/or mechanical contact) with the second conductors 60 when in the first position.

Figure 3C:
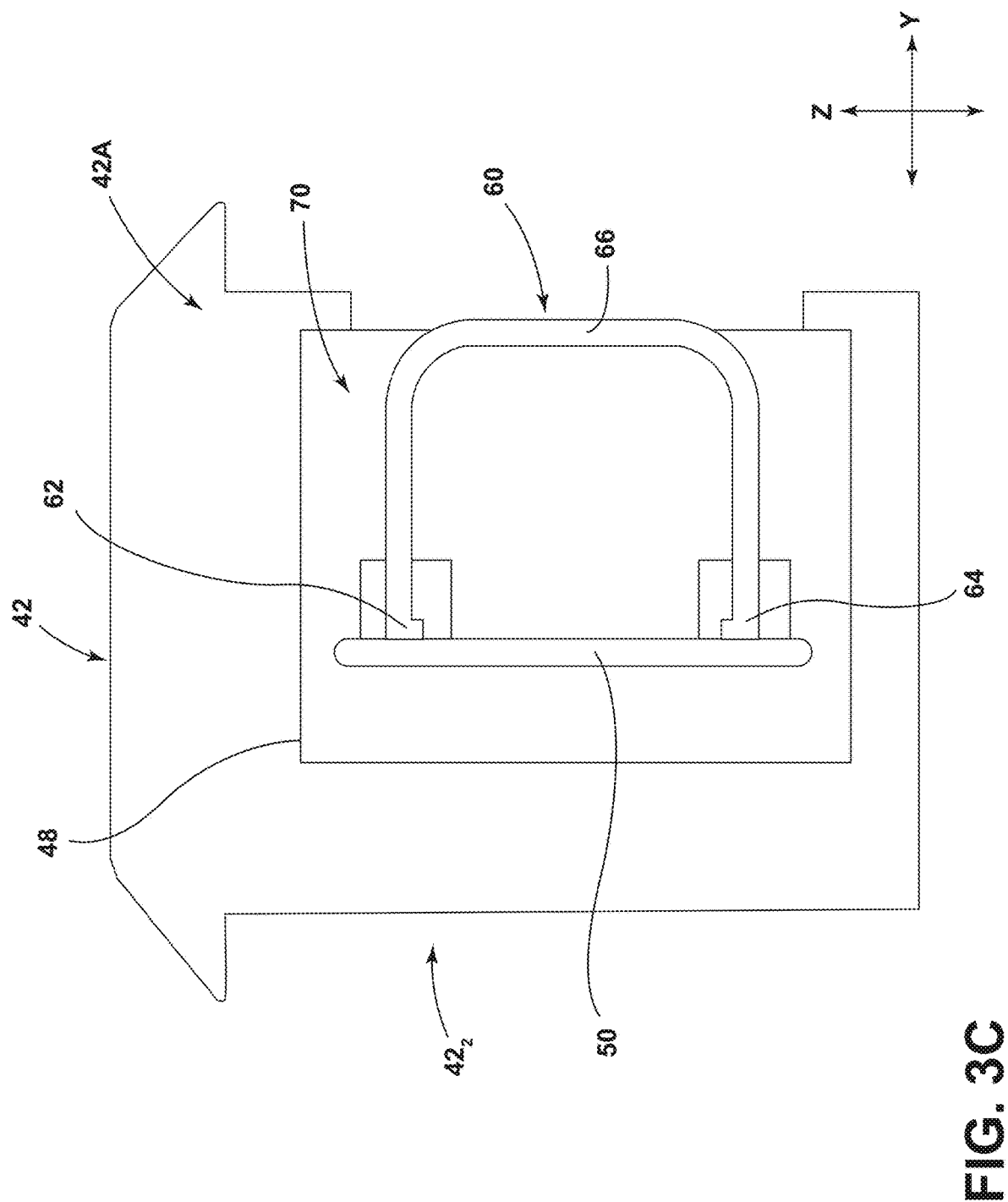
FIG. 3C is a cross-sectional view generally illustrating portions of an embodiment of a track assembly according to teachings of the present disclosure.
Figure 4:
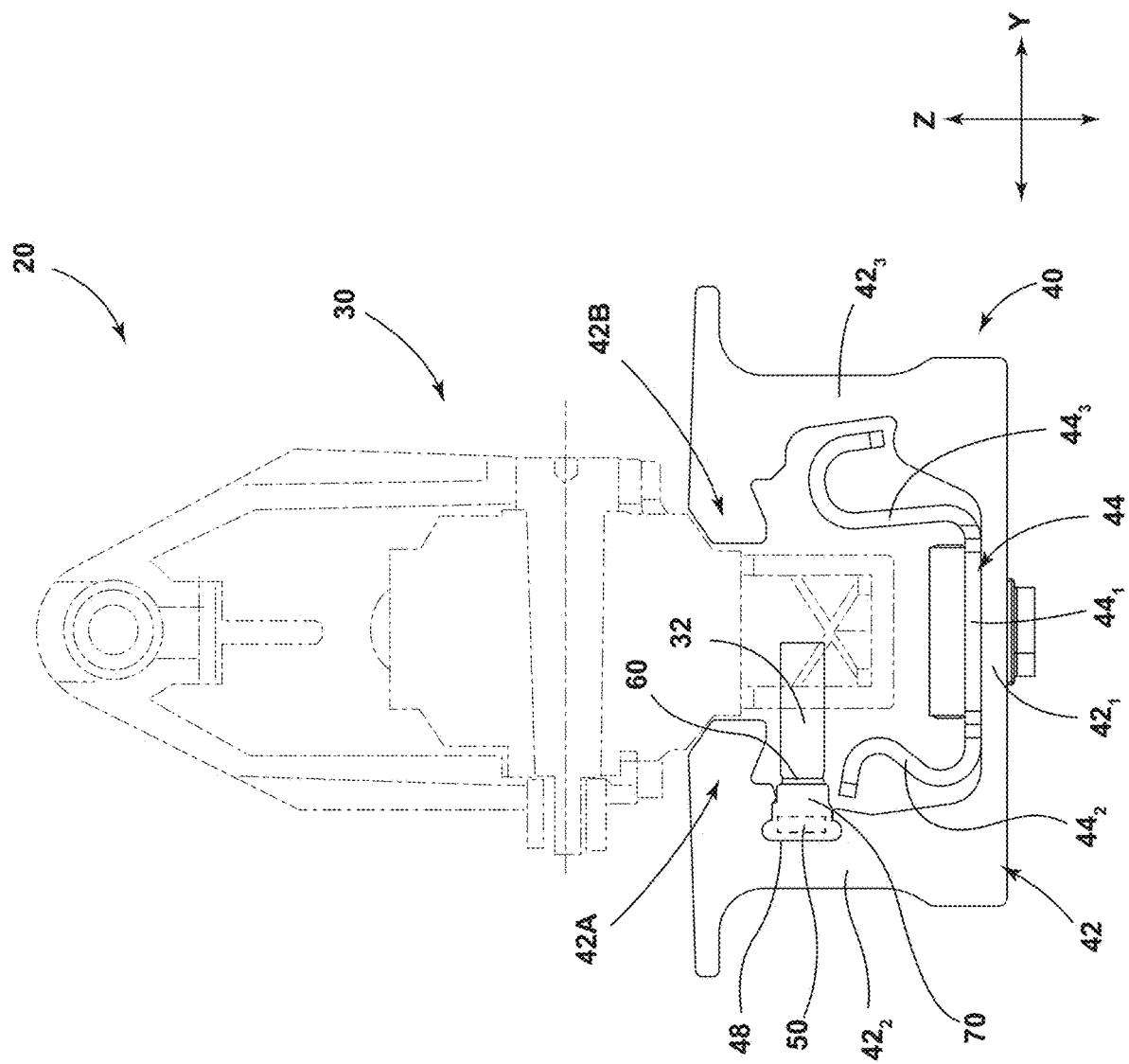
FIG. 4 is a cross-sectional view generally illustrating an embodiment of a track assembly according to teachings of the present disclosure.
Figure 5A:
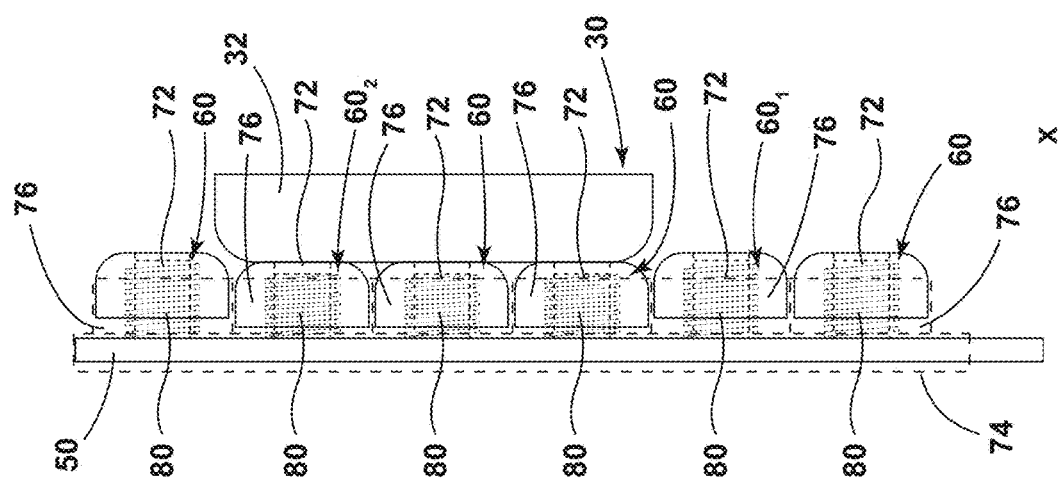
FIGS. 5A, 5B, and 5C are top cross-sectional views generally illustrating an embodiment of a track assembly according to teachings of the present disclosure.
Figure 5B:
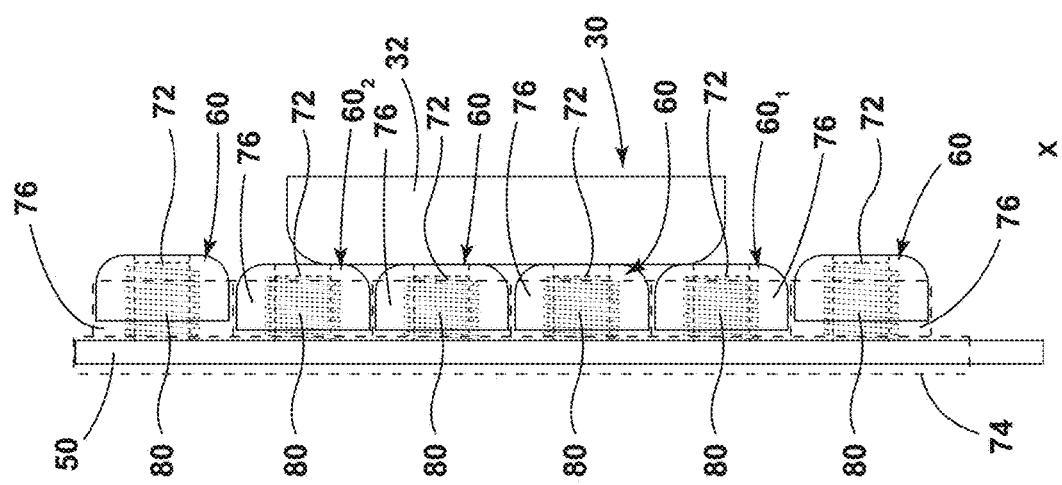
Figure 5C:
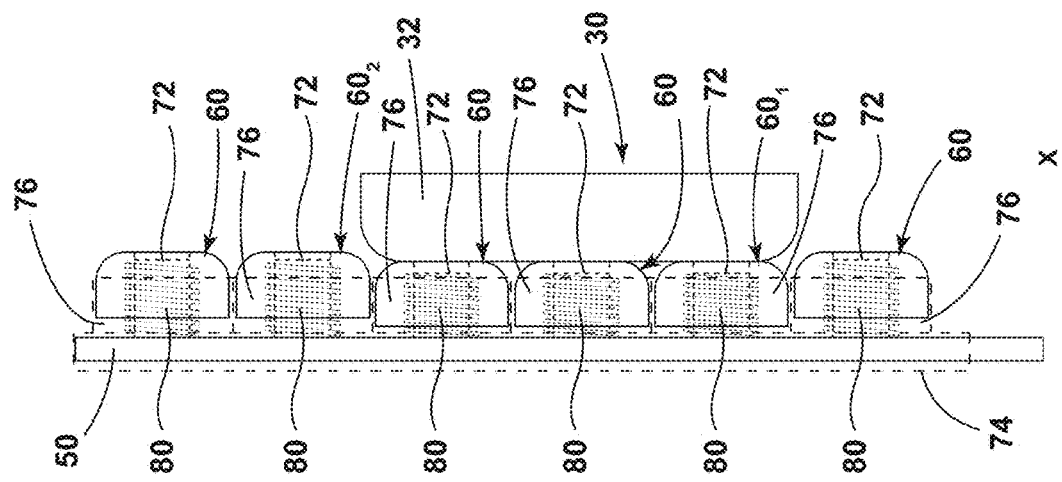

With embodiments, such as generally illustrated in FIGS. 3A, 3B, and 3C, the support member conductor 32 may have a second position. When the support member conductor 32 is in the second position, the support member conductor 32 may project (e.g., in the Y-direction) outward from the support member 30. In the second position, the support member conductor 32 may project a distance from the support member 30 such that the support member 30 may not be removed (e.g., in the Z-direction) from the track 40 and/or such that the support member 30 may not be inserted (e.g., in the Z-direction) into the track 40. The support member conductor 32 may be in contact (e.g., electrical and/or mechanical) with one or more of the second conductors 60 when in the second position.

In embodiments, such as generally illustrated in FIGS. 1A, 1C, 3A, and 3C, the second conductors 60 may be substantially U-shaped. The second conductors 60 may include a first end 62, a second end 64, and/or a side 66. The first end 62 and/or the second end 64 of the second conductors 60 may extend toward and/or be disposed proximate the first conductor 50. For example, the first end 62 and/or the second end 64 may be closer to the first conductor 50 than the side 66 of a second conductor 60. The first end 62 and/or the second end 64 of the second conductors 60 may be configured to contact the first conductor 50. The second conductors 60 may move between a position of electrical and/or mechanical contact with the first conductor 50 (e.g., a connected position), and/or a position with no electrical and/or mechanical contact with the first conductor 50 (e.g., a disconnected position). For example and without limitation, in the disconnected position, the second conductor 60 may be offset from the first conductor 50 such that a gap 68 may be disposed between the first end 62 and/or the second end 64 of the second conductor 60 and the first conductor 50. In the connected position, the second conductor 60 may be disposed in contact with the first conductor 50 (e.g., there may not be a material or significant gap between the first end 62 and/or the second end 64 of the second conductor 60 and the first conductor 50). The second conductors 60 may be electrically and/or mechanically connected to each other in the X-direction.

With embodiments, the support member 30 may be configured to move the support member conductor 32 from the first position to the second position to contact one or more of the second conductors 60 (e.g., with the sides 66 of the one or more second conductors 60). As the support member conductor 32 moves from the first position to the second position, the support member conductor 32 may cause the one or more second conductors 60 to translate (e.g., outward in the Y-direction) from the disconnected position to the connected position, which may result in the first conductor 50 being electrically connected with the one or more second conductors 60, and the one or more second conductors 60 being electrically connected with the support member conductor 32. For example and without limitation, the first end 62 and/or the second end 64 of the one or more second conductors 60 may move outward to contact the first conductor 50. The support member conductor 32 may only contact the side 66 of the second conductor 60, which may be the only portion of the second conductor 60 exposed (e.g., from the aperture 72 of the insulator 70). One or more biasing members 80 may bias the second conductors 60 toward the extended position.

In embodiments, such as generally illustrated in FIGS. 4, 5A, 5B, and 5C, the second conductors 60 may be substantially rectangular and/or cylindrical. The second conductors 60 may be fixed to the first conductor 50 (e.g., instead of moving between connected and disconnected positions). The second conductors 60 may be electrical and mechanically connected to the first conductor 50. The insulator 70 may include a first portion 74 and/or a second portion 76. The first conductor 50 may be disposed substantially in the first portion 74 of the insulator 70. A second portion 76 may be associated with each second conductor 60. The second conductors 60 may be disposed partially within the first portion 74 and/or respective second portions 76. The second portions 76 may move (e.g., in the Y-direction) relative to the first portion 74, such as between an extended position and a retracted position to selectively expose respective second conductors 60. The second portions 76 may include respective apertures 72. In the extended position, the second conductors 60 may not be exposed (e.g., may not extend inward beyond the aperture 72). In the retracted position, the side 66 of the second conductor 60 may extend to end of and/or through the aperture 72 of the second portion 76 of the insulator 70. The insulator 70 may include biasing members 80 that may be configured to bias respective second portions 76 of the insulator 70 toward the extended position.

With embodiments, such as generally illustrated in FIG. 5, when the support member conductor 32 moves from the first position to the second position, the support member conductor 32 may move (e.g., in the Y-direction) one or more second portions 76 of the insulator 70 toward the first portion 74 of the insulator 70. Moving the second portion 76 of the insulator 70 to the retracted position may expose the side 66 of the second conductor 60 such that the support member conductor 32 may electrically and/or mechanically connect with the second conductor 60.

In embodiments, such as generally illustrated in FIGS. 6A and 6B, the insulator 70 may be fixed or substantially fixed relative to the first conductor 50. The second conductors 60 may be configured to move (e.g., in the Y-direction) relative to the first conductor 50 and/or the insulator 70. The second conductor 60 may include a first end 62 and/or a second end 64. The first end 62 may contact the first conductor 50, and/or the second end 64 may contact the support member conductor 32. The support member conductor 32 may move the second conductor 60 into contact (e.g., electrical and/or mechanical) with the first conductor 50.

In embodiments, such as generally illustrated in FIGS. 1B, 3B, 5A, 5B, 5C, 6A, and 6B, the plurality of second conductors 60 may be disposed longitudinally (e.g., in the X-direction) along the first conductor 50. The support member conductor 32 may be configured to contact more than one second conductor 60 at a time. For example and without limitation, the support member conductor 32 may contact two and/or three (or more) second conductors 60 at a time. The support member conductor 32 may be configured to contact at least two second conductors 60 in all positions of the support member 30 to improve the electrical connection quality and/or reliability between the support member 30 and the track 40 (e.g., in the X-direction). The support member 30 and/or the support member conductor 32 may move (e.g., in the X-direction) along the plurality of second conductors 60, such as to adjust the position of the vehicle seat 24. When the support member conductor 32 is in the second position, movement of the support member 30 in the X-direction may result in the support member conductor 32 connecting and/or disconnecting (e.g., electrically, mechanically, automatically) with the plurality of second conductors 60 (see, e.g., FIGS. 5A, 5B, and 5C). For example and without limitation, as the support member 30 moves along the track 40, the support member conductor 32 may connect with the next second conductor 602 in the direction of travel and/or may disconnect from the last second conductor 601 opposite the direction of travel. The support member conductor 32 may connect and/or disconnect with the plurality of second conductors 60 (e.g., automatically) such that the support member 30 maintains an electrical connection with the first conductor 50 while the support member 30 moves along the track 40 and/or in some or all positions of the support member 30 relative to the track 40. For example and without limitation, the track assembly 20 may be configured to allow the support member 30 to be connected/inserted and disconnected/removed at some or all positions along the track 40. Connecting and disconnecting the support member conductor 32 with the second conductors 60 may include movement of the second conductors 60 (e.g., as described in connection with FIGS. 1A, 1B, 1C, 3A, 3B, 6A, and 6B). Additionally or alternatively, connecting and disconnecting the support member conductor 32 with the second conductors 60 may include movement of the second portions 76 of the insulator 70 to expose the second conductors 60 (e.g., as described in connection with FIGS. 4, 5A, 5B, and 5C).

In embodiments, the support member conductor 32 may include a first end 34, a second end 36, and/or a third end 38. The first end 34 may be disposed opposite the second end 36. The third end 38 may be disposed substantially parallel to the track 40, and/or the first end 34 and/or the second end 36 may be disposed substantially perpendicular to the third end 38. The first end 34, the second end 36, and/or the third end 38 may be configured to at least partially contact the second conductor 60. The first end 34, the second end 36, and/or the third end 38 may include rounded configuration.

With embodiments, the second conductor 60 and/or the insulator 70 may include a substantially rounded configuration such that movement (e.g., in the X-direction) of the support member 30 (e.g., when in the second position) moves the next (e.g., successive) second conductor 60 and/or the insulator 70 towards the first conductor 50 (e.g., in the Y-direction).

In embodiments, a method of operating the track assembly 20 may include inserting the vehicle seat 24 and/or the support member 30 into the track 40. The method may include actuating the support member conductor 32 to electrically connect the support member conductor 32 to the second conductors 60. Connection between the support member conductor 32 and the second conductor 60 may provide an electrical connection between the first conductor 50 and the support member conductor 32. Connecting the support member conductor 32 to the second conductor 60 may include compressing the biasing members 80 such that the second conductor 60 may move in the Y-direction to contact the first conductor 50, which may provide electrical power to the vehicle seat 24. The method may include electrically and/or mechanically disconnecting the support member 30 and the track 40 (e.g., electrically and/or mechanically disconnecting the support member conductor 32 from the second conductors 60). The method may include removing (e.g., in the Z-direction) the vehicle seat 24 from the track assembly 20 and/or inserting the vehicle seat 24 into the track 40 at the same or different location along the track 40 (e.g., in the X-direction).

With embodiments, the ECU 28 may include and/or be connected to a diagnostic system. The diagnostic system may be configured to determine a state of the track assembly 20. The ECU 28 and/or the diagnostic system may determine a connection state of the first conductors 50, the second conductors 60 and/or the support member conductor 32. For example and without limitation, the diagnostic system may determine a variety of mechanical and/or electrical states of the conductors 50, 60, 32 (e.g., partial mechanical and/or electrical connection, complete mechanical and/or electrical connection, and/or no mechanical and/or electrical connection). The diagnostic system may be configured to determine whether the track assembly 20 is functioning properly (e.g., whether the second conductors 60 and/or second portions 76 are properly moving in response to the support member conductor 32).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A track assembly for a vehicle component, comprising:
    a track;
    a support member;
    a support member conductor;
    a first conductor; and
    a plurality of second conductors;
    wherein the support member conductor is configured to move substantially laterally and electrically contact the plurality of second conductors; and the plurality of second conductors are configured to move laterally and electrically contact the first conductor.

2. The track assembly of claim 1, wherein the support member conductor is configured to move the second conductors into electrical contact with the first conductor.

3. The track assembly of claim 1, wherein the first conductor extends substantially in a longitudinal direction of the track and the first conductor is disposed at least partially in the track.

4. The track assembly of claim 1, wherein the plurality of second conductors are disposed such that the support member conductor is contact with at least two second conductors of the plurality of second conductors in all positions of the support member relative to the track.

5. The track assembly of claim 1, wherein the support member conductor has a first position and a second position; when the support member conductor is in the first position, the support member conductor is in contact with one or more the plurality of second conductors; and when the support member conductor is in the second position, the support member conductor is not in contact with the second conductor.

6. The track assembly of claim 5, wherein the support member is configured to move vertically when the support member conductor is in the first position, and vertical movement of the support member is restricted or limited when the support member conductor is in the second position.

7. The track assembly of claim 1, wherein the first conductor and the plurality of second conductors are disposed at least partially within an insulator; and the insulator includes an aperture.

8. The track assembly of claim 7, wherein the support member conductor is configured to be at least partially disposed in the aperture.

9. The track assembly of claim 7, wherein the insulator includes a biasing member.

10. The track assembly of claim 1, wherein at least one of the plurality of second conductors includes a first end, a second end, and a side; the first end and the second end are configured to contact the first conductor; and the support member conductor is configured to contact the side.

11. The track assembly of claim 1, wherein at least one of the plurality of second conductors is substantially U-shaped.

12. The track assembly of claim 1, wherein the track includes an inner track and an outer track; the inner track is disposed within the outer track; the outer track includes a recess; and the first conductor and the plurality of second conductors are disposed at least partially in the recess.

13. The track assembly of claim 12, wherein the recess is disposed at least partially between a top of the inner track and a top of the outer track.

14. A track assembly for a vehicle component, comprising:
   a track;
   a support member including a support member conductor;
   a first conductor; and
   a plurality of second conductors;
   wherein the support member conductor includes a first position and a second position; the support member conductor is configured not to be in contact with the plurality of second conductors when in the first position; and the support member conductor is configured to contact at least one of the plurality of second conductors when in the second position.

15. The track assembly of claim 14, wherein the plurality of second conductors are fixed to the first conductor.

16. The track assembly of claim 15, including an insulator having a first portion and a plurality of second portions; wherein each second portion of the plurality of second portions is associated with a respective second conductor of the plurality of second conductors; and the plurality of second portions are configured to translate to expose the plurality of second conductors to electrical connect the first conductor with the support member conductor.

17. The track assembly of claim 16, including one or more biasing members configured to bias the plurality of second portions toward an extended position in which the plurality of second conductors are covered by the plurality of second portions.

18. The track assembly of claim 15, wherein the support member conductor is configured to move longitudinally along the plurality of second conductors and automatically electrically connect the second conductors, the first conductor, and the support member conductor.

19. The track assembly of claim 15, wherein the plurality of second conductors are configured to move in a first direction when contacted by the support member conductor; the plurality of second conductors are configured to move in a second direction when no longer in contact with the support member conductor; and the first direction is opposite the second direction.

20. The track assembly of claim 16, wherein each of the plurality of second portions include a respective aperture; and each of the plurality of second conductors are configured to extend through the respective aperture when the support member conductor is in contact with each of the plurality of second conductors.

* * * * *